Oct. 5, 1965  E. FRISCH  3,210,026
ORBITING SPACE PLATFORM
Filed March 8, 1963  4 Sheets-Sheet 1

WITNESSES:
Bernard R. Gieguay
Edward F. Possessky

INVENTOR
Erling Frisch
BY D. Smith
ATTORNEY

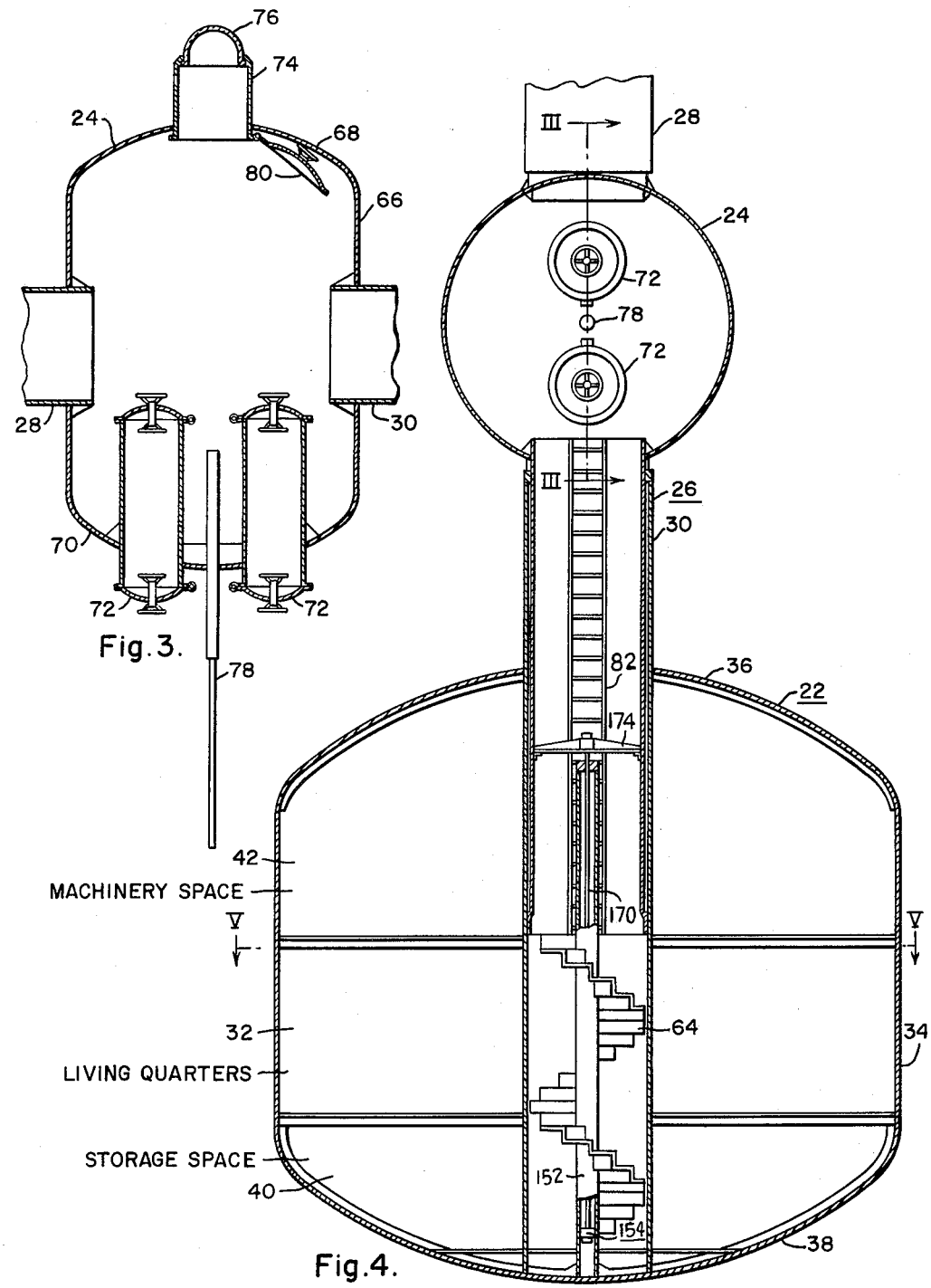

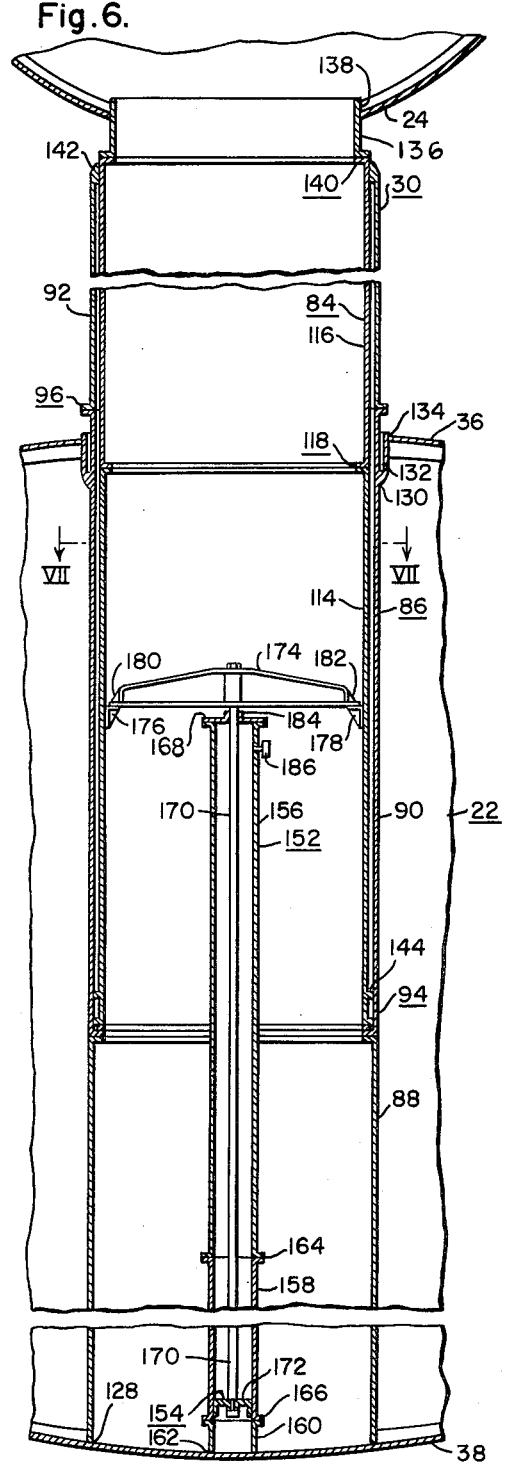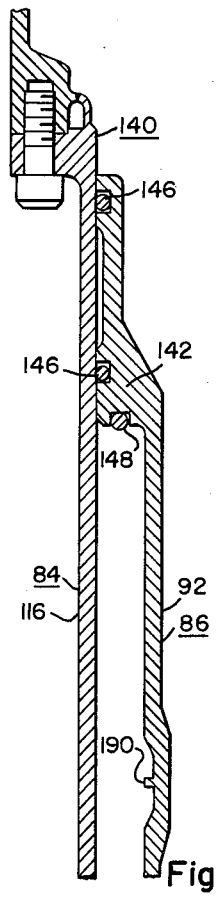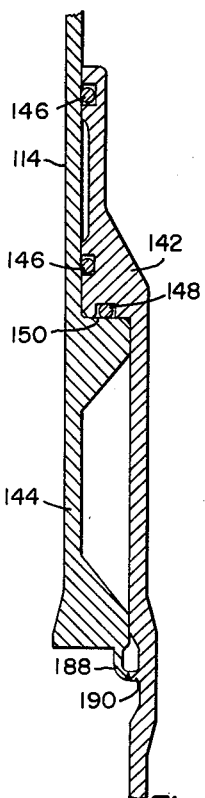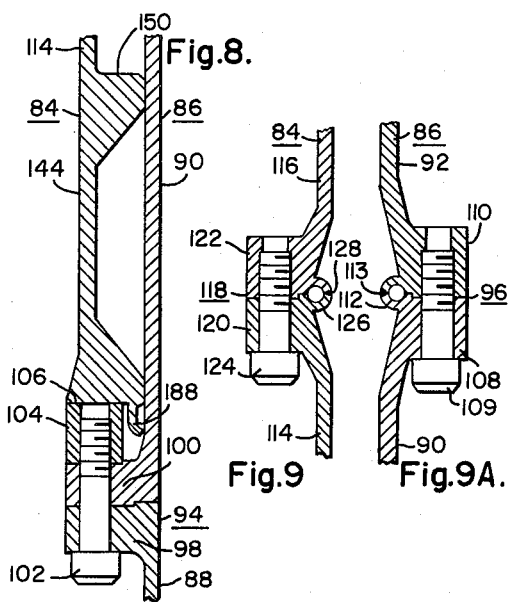

United States Patent Office 3,210,026
Patented Oct. 5, 1965

3,210,026
ORBITING SPACE PLATFORM
Erling Frisch, Pittsburgh, Pa., assignor to Westinghouse Electric Corporation, Pittsburgh, Pa., a corporation of Pennsylvania
Filed Mar. 8, 1963, Ser. No. 263,887
14 Claims. (Cl. 244—1)

The present invention relates to space platforms and more particularly to such platforms which are lifted into orbit as a unit and which are expandable in size after the lifting power is removed.

There are two methods by which a relatively large space platform can be disposed in a space orbit and one of these is through the use of rendezvous techniques whereby separately orbited components are assembled together in orbit by a space crew. The other method is simply by lifting a space platform as a unit into space, and in view of the undeveloped nature of rendezvous techniques it is to be expected that better reliability and better overall results can be achieved through this unit method.

Disadvantages of the unit method include the fact that rocket power may not be available for lifting a space platform of desired given weight, and further, the fact that, even if rocket power is available to lift a space platform of the desired weight, the platform itself may be of such size as to necessitate a prohibitively large and weighty rocket casing which then causes the overall weight of the lifting rocket to exceed its lifting capability. It is the latter circumstances to which the present invention is related and in these circumstances the casing size and weight problem can be resolved if the space platform is constructed so as to be reliably and simply expandable from a retracted state in which it fits into a rocket casing of acceptable and economic size and weight to an expanded state in which it provides ample space and envrionmental conditions for its particular space mission.

Therefore, in accordance with the broad principles of the invention, an expandable space platform comprises a pair of outer cabins joined together by means of a telescopic arrangement and preferably a main central cabin is incorporated in the structure midway between the outer cabins. Further, the outer cabins can include living quarters with suitable atmospheric and other environmental conditions for a space crew and in addition can include space for storage, operating machinery and equipment, test equipment and the like. Ladder means extending through the telescopic arrangement can provide access from the outer cabins to the central cabin where such functions as observation and space craft mooring can be provided.

The telescopic arrangement is held in retracted position desirably by the force of atmospheric pressure when the space platform is disposed within the forward portion of a rocket casing so that uneconomically or infeasibly excessive casing weight is avoided in the unfired lifting rocket. When the platform is disposed in orbit, the telescopic arrangement is expanded, for example, by means of internal pressure, so as to increase the spacing between the outer cabins. In addition, rotational movement is imparted to the platform by suitable means such as controlled jets so that a comfortable "gravity" field is established in the outer cabins. Expanding movement of the telescopic arrangement can be smoothly controlled, in accordance with the invention, before and during the orbiting flight.

Accordingly, it is an object of the invention to provide a novel and efficient expandable space platform wherein the structure and operation thereof is characterized with simplicity and reliability.

An additional object of the invention is to provide an expandable space platform wherein expanding movement is accomplished smoothly and without impact shock.

It is another object of the invention to provide an expandable space platform wherein the retracted platform size is small enough to provide for an economic rocket casing size and wherein the expanded platform size is large enough to provide for creature comforts and comfortable simulated gravity conditions.

An additional object of the invention is to provide a space platform capable of being expanded wherein a telescopic arrangement is employed to control the expanding movement of the platform;

A further object of the invention is to provide an expandable space platform wherein a telescopic arrangement is employed to control the expanding movement of the platform and wherein internal atmospheric pressure provides the necessary force for expanding movement of the platform.

Another object of the invention is to provide an expandable space platform having a telescopic arrangement to achieve such expansion and wherein a valve-contolled piston arrangement is employed to control the extent to which the telescopic arrangement expands the platform in size.

It is also an object of the invention to provide an expandable space platform employing a telescopic arrangement to achieve expanding movement wherein effective sealing means are provided to prevent pressure escape from the space platform along the telescoping portions thereof.

These and other objects of the invention will become more apparent upon consideration of the following detailed description along with the attached drawings, in which:

FIGURE 3 is an enlarged vertical sectional view showing in greater detail a central cabin of the space platform of FIGURES 1 and 2.

FIGURE 4 is an enlarged top view of the space platform of FIGURES 1 and 2 with portions thereof broken away so as to show in greater detail the inner structure of an outer cabin thereof.

FIGURE 6 is an enlarged view of a portion of a longitudinal section of the space platform of FIGURES 1 and 2 so as to show in greater detail a telescopic arrangement for controlling the expanding movement of the platform.

FIGURES 8 and 10 show enlarged portions of the cross section of FIGURE 6 in greater detail when the telescopic arrangement is in its retracted position.

FIGURES 9 and 9A show respective enlarged portions of the cross section of FIGURE 6 in greater detail.

FIGURE 11 shows an enlarged portion of the cross section of FIGURE 6 in greater detail when the telescopic arrangement is in its expanded position.

Figure 1:
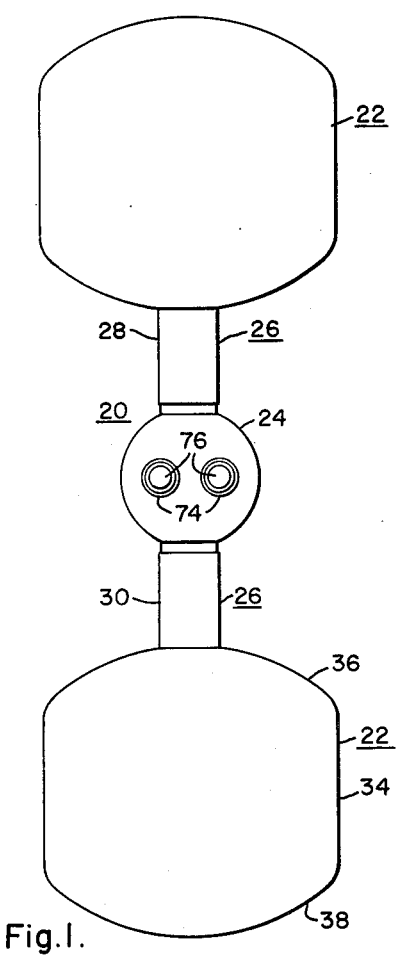
FIGURE 1 is a top plan view of an elongated space platform constructed in accordance with the principles of the invention and disposable in a rocket casing with its longitudinal dimension aligned with the casing in vertical direction.
Figure 2:
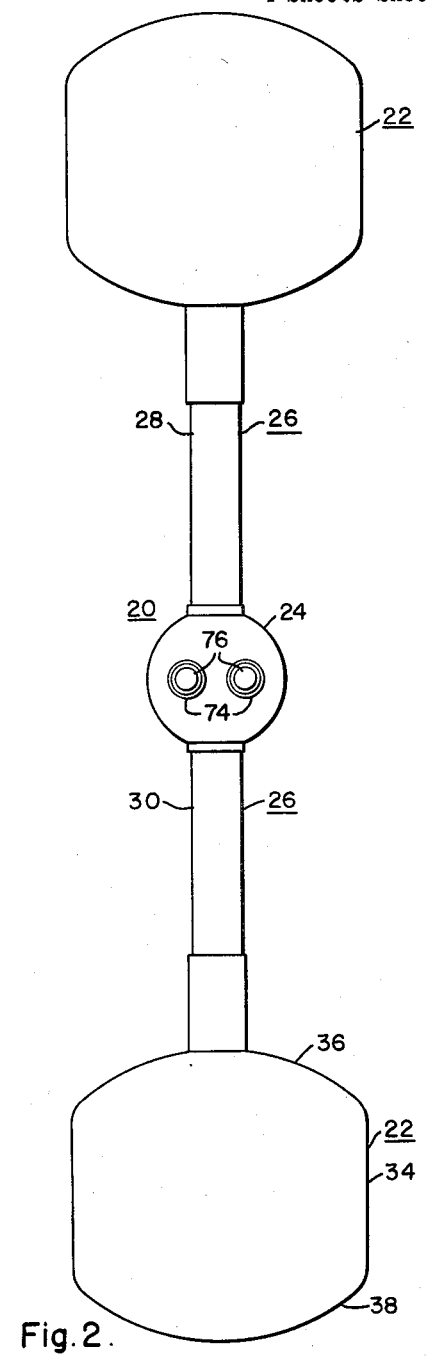
FIGURE 2 is a top plan view of the space platform of FIGURE 1 when it is disposed in orbit and expanded in size or length.

More specifically, there is shown in FIGURES 1 and 2 a space platform 20 in respective retracted and expanded positions. The space platform 20 is generally constructed of suitable structural material such as aluminum and includes outer cabins 22 and an inner middle cabin 24 which are all connected together by means of a telescopic arrangement 26 for effecting expanding movement of the platform 20. The arrangement 26 comprises separate telescopic portions 28 and 30 for this purpose, and, as one example, the retracted or prelaunch length of the space platform 20 can be 92 feet and the expanded or orbital or post-launch length can be 135 feet.

The outer cabins 22 can include a living quarter level 32 (FIGURES 4 and 5) and with the illustrative expanded platform length a simulated gravitational field in the outer cabins 22 will not have materially noticeable gradient along the height of an individual standing on the level 32. A simulated gravitational field can be produced by rotation of the outer cabins 22 about the middle cabin 24 as an axis and this rotation can be initiated (preferably after completion of platform expanding movement) and controlled by means of suitable rocket or jet devices (not shown). If the illustrated dimensional design is employed, a rotation rate of 2.5 revolutions per minute provides a simulated gravitational field equivalent to that existing on the surface of the moon.

Each of the outer cabins 22 comprises a generally cylindrical central portion 34 which is capped by respective domed end portions 36 and 38. In the illustrative dimensional design, the outer cabin central portion 34 can have a diameter of 30 feet and the maximum height or length of the outer cabin between the domed end portions of 36 and 38 can be 30 feet. The living quarters level 32 is disposed in the outermost cross-sectional reference plane through the cylindrical cabin portion 34 so as simultaneously to obtain maximum available simulated gravitational effect as well as uniformly outlined living space. Space 40 within the contour of the domed end cabin portion 38 can be used for storage or other desired purposes. The balance of space 42 within the outer cabin 22 can be used for machinery and equipment placement as well as other purposes.

Figure 5:
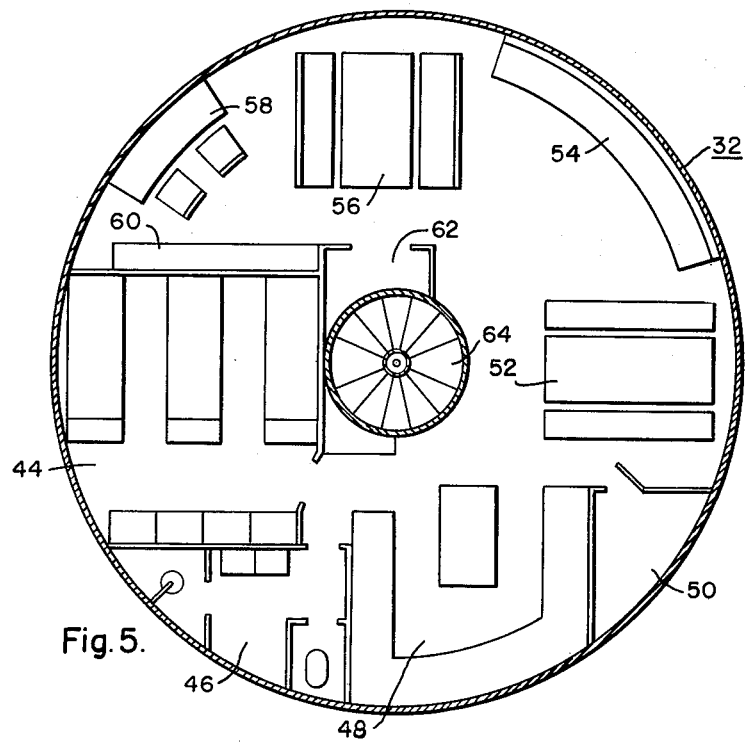
FIGURE 5 is a floor plan view of the living quarters level in the outer cabin of FIGURE 4.

As shown in FIGURE 5, the living quarters level 32 can include such floor plan items as follows:

Bunk room (9 bunks)—44    Table and settees—56
Wash room—46              Writing desk—58
Galley—48                 Book shelves—60
Freezer—50                Closet—62
Dining or mess table—52   Circular staircase—64
Settee—54

Other floor plans may be employed and in any case a final decision on space utilization must be based on a balance among the interests of psychological and physical living needs, available space, and operational requirements.

The central cabin 24 (as better viewed in FIGURE 3) also includes a cylindrical portion 66 which is capped by domed end portions 68 and 70. The diameter of the central cabin cylindrical portion 66 can be 15 feet and the maximum dimension between the central cabin domed end portions 68 and 70 can be 21 feet in the illustrative dimensional design. One or more suitably sealed access hatches 72 can be provided through the domed end portion 70 and an observation tower 74 provided with a domed window 76 can be disposed through the domed end portion 68. A mooring mast 78 can be supported by the domed end portion 70 for the purpose of engagement with another space craft during a rendezvous operation. A cover 80 is provided for the observation tower 74 in the event an emergency seal is required between this structure and the inner space of the central cabin 70. Access to the central cabin 24 is provided by means of a ladder 82 (FIGURE 4) extending through each telescopic portion 28 or 30 from the circular stair case 64 in each outer cabin 22.

The telescopic portion 28 or 30 (FIGURE 6) comprises an inner telescopic member 84 and outer telescopic member 86 which are respectively tubular in form and disposed in slidable relationship one within the other. In the illustrative dimensional design, the outer diameter of the telescopic member 86 can be 6 feet and each of the telescopic members 84 or 86 can comprise two or more elongated cylindrical or tubular segments. If this is the case, cylindrical segments 88, 90 and 92 of the outer telescopic member 86 can be joined together respectively by joints 94 and 96. As shown in FIGURE 8, the joint 94 comprises annular joint portions 98 and 100 of the cylindrical segments 88 and 90 and bolt(s) 102 for holding the joint portions 98 and 100 against separation. A threaded member 104 is engaged with each bolt 102 in this case for the purpose of providing a stop surface 106 for the inner telescopic member 84 when it is in the retracted position. The joint 96 (FIGURE 9A) similarly includes annular joint flange portions 108 and 110 of the cylindrical segments 90 and 92 and bolt(s) 109 for holding such flange portions together and in this case inner canopy portions 112 of the joint flange portions 108 and 110 are preferably seal welded together as indicated by the reference character 113 to provide positive sealing means against pressure loss to exterior space.

The inner telescopic member 84 can also be provided with two or more elongated cylindrical segments, for example segments 114 and 116 which are joined together by an annular joint 118 (in detail in FIGURE 9). The joint 118 also includes annular joint flange portions 120 and 122 of the cylindrical segments 114 and 116 and such flange portions are held together by bolt(s) 124. Again, flange canopy portions 126 can be seal welded together to prevent pressure loss as indicated by the reference character 128.

The outer telescopic member 86 is fixed relative to the associated outer cabin 22 and can also serve as a main central supporting member therefor. Thus, the cylindrical segment 88 of the outer telescopic member 86 can be seal welded to a wall of the domed end portion 38 of the associated outer cabin 22 as indicated by the reference character 128. Further, the outer telescopic member 86 or the cylindrical segment 90 is also seal welded as indicated by the reference character 130 to a wall of the other domed end portion 36 of the associated outer cabin 22 but it is preferred in this case that an intermediate or skirt member 132 be disposed between the wall of the domed end portion 36 and the outer telescopic member 86. In this manner, the skirt 132 can be seal welded to the telescopic member 86 prior to machine finishing of the interior surface thereof. Accordingly, a good machine fit of the inner telescopic member 84 relative to the outer telescopic member 86 can then be obtained without subsequent warpage since welding of the wall of the outer cabin domed portion 36 to the skirt 132 as indicated by the reference character 134 can then be accomplished without excessive heat transfer to the outer telescopic member 86.

The inner telescopic member 84 is fixed in relation to the central cabin 24 and for this purpose an end cylindrical segment 136 of the inner telescopic member 84 is seal welded to the cylindrical portion 66 of the central cabin 24 as indicated by the reference character 138. The end cylindrical telescopic member segment 136 is supported relative to the adjacent telescopic member segment 116 by means of an annular joint 140 which is pressure-sealed in a manner similar to that described in relation to the joints 94, 96 and 118.

Sliding movement between the inner and outer telescopic members 84 and 86 is guided by means of annular flange portion 142 of the outer telescopic member 86 which is disposed for annular sliding engagement with the outer surface of the inner telescopic member 84 and in addition piston head portion 144 of the inner telescopic member 84 which is disposed for sliding engagement with the inner surface of the outer telescopic member 86. The stop member(s) 104 limit the retracting movement of the inner telescopic member 84 within the outer telescopic member 86 and in turn the annular flange portion 142 of the outer telescopic member 186 provides a limit of expanding movement of the telescopic members 84 and 86 by its engagement with the annular head portion 144 of the inner telescopic member 84.

As viewed in FIGURE 10, the outer telescopic member flange portion 142 can be sealed relative to the outer surface of the inner telescopic member 84 by suitable means such as gaskets 146 disposed in suitable annular slots. When the telescopic members 84 and 86 are fully expanded, another gasket 148 can provide additional sealing effect between the outer telescopic member flange portion 142 and stop surface 150 of the inner telescopic member head portion 144. A double seal by gaskets 146 as shown provides assurance against leakage when the joint 118 of the inner telescopic member 84 passes over the outer telescopic member flange portion 142.

After the space platform 20 is completely assembled and tested for structural integrity and pressure leaks and the like, it is disposed in the retracted position on the launch platform and the interior atmosphere of the space platform 20 is partially exhausted until the pressure is reduced to a value desired for space conditions, for example, 9 lbs. per square inch, which will, of course, decrease slightly when the platform is expanded. Because of pressure produced by the atmosphere of the earth, the telescopic members 84 and 86 are automatically held in the retracted position where the inner piston head portion 144 is engaged with the outer telescopic member stop surface(s) 106. When the space platform 20 is being boosted into orbit, the interior or cabin pressure thereof produces a force which urges the telescopic members 84 and 86 outwardly of or apart from each other because of the dwindling exterior or ambient pressure which approaches zero.

To prevent any relative sliding movement until the desired time and to control such movement when it is desired, means are provided in the form of a restraining cylinder 152 (FIGURE 6) and piston 154 so as to control the positioning of each inner telescopic member 84 relative to its associated outer telescopic member 86 and outer cabin 22. The cylinder 152 is elongated and preferably disposed along the longitudinal center line of the telescopic members 84 and 86. Further, the cylinder 152 can be formed from two or more elongated cylindrical segments such as segments 156, 158 and 160, and suitable supporting means can be provided therefor. For example, the segment 160 can be welded to the domed end cabin portion 38 as indicated by the reference character 162 to provide the main support for the cylinder 152 relative to the associated outer cabin 22. The segments 156, 158 and 160 can be secured together through respective annular joints 164 and 166 which are suitably sealed. In addition, the inmost end of the cylinder segment 156 can be closed and suitably sealed through the engagement of a cap member 168 therewith.

Figure 7:
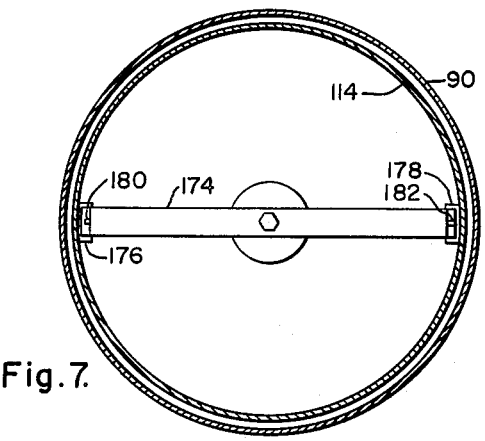
FIGURE 7 shows a cross-section of the telescopic arrangement taken along the reference line VII—VII of FIGURE 6.

The piston 154 comprises a piston shaft 170 and a piston head 172 disposed for smooth sliding engagement along the inner surface of the cylinder 152. The piston shaft 170 extends longitudinally through the end cap 168 and is secured to a support beam 174. The beam 174 in turn extends laterally across the interior of the inner telescopic member 84 and it is rigidly supported relative thereto (FIGURE 7) by means of respective brackets 176 and 178 which are suitably welded to the interior surface of the inner telescopic member 84 and which support end portions 180 and 182 of the support beam 174. Rigidity can be provided for the support beam 174 by welding or otherwise securing the end portions 180 and 182 thereof to the telescopic member brackets 176 and 178.

Maintenance of pressure within the cylinder 152 is obtained by providing contact engagement between the piston head 172 and the inner surface of the cylinder 152 through piston rings or other suitable sealing means (not shown) and further by providing a suitable seal 184 where the piston shaft 170 extends through the cylinder end cap member 168. Thus, although the exterior space pressure may be as low as zero the internal pressure of the cylinder 152 can be made sufficiently great to provide a holding force on the piston head 172 in excess of the expansion force produced by the internal cabin pressure against the telescopic members 84 and 86. The amount of cylinder pressure necessary to obtain a given desired holding force against the piston head 172 is dependent upon the surface area of the piston head 172 and the magnitude of the internal cabin pressure as well as the total surface area upon which the internal cabin pressure produces expanding force.

Once the space platform 20 is aloft, expanding movement of the telescopic members 84 and 86 can be smoothly controlled by the telescopic movement control means or the cylinder 152 and the piston 154 through the employment of pressure control means such as a release magnet valve 186 attached to the cylinder 152 or cylinder segment 156. Inherent damping is provided for the expanding movement of the telescopic members 84 and 86 since for a given step change in pressure within the cylinder 152, the velocity of expanding movement constantly decreases as the piston head 172 encounters more and more internal cylinder pressure through its release movement. On the other hand, pressure release from the cylinder 152 by the valve 186 can be accomplished smoothly and over a relatively long period of time so that a relatively small constant expanding velocity is obtained and so that little or no damping force is even required.

Thus, when full expansion of the telescopic members 84 and 86 is nearly completed, the separating velocity of the telescopic members 84 and 86 can be held so small that insignificant impact is encountered when the limit of movement is met where the inner telescopic member piston head portion surface 150 engages the outer telescopic member flange portion 142. Thereafter, members of the space crew can produce a weld between canopy portion 188 of the telescopic head portion 144 and canopy portion 190 of the outer telescopic member 86. This is the only manufacturing workstep required of the space crew to place the space platform 20 in final condition for the orbit journey, and, when completed, the welded canopy portions 188 and 190 provide a rigid seal weld against escape of cabin pressure so that pressure maintenance need not depend on the resilient gaskets 146 and 148 at this location.

In the expanded position, the space platform 20 provides in the illustrative dimensional design approximately 39000 cubic feet of interior space or about 2000 cubic feet of an interior space per man for a crew of 18 men. Further, the interior cabin pressure can be maintained at the desired level (such as nine p.s.i.a.) which is equivalent to the pressure at an altitude 10,000 feet on the earth.

The foregoing description has been presented only to illustrate the principles of the invention. Accordingly, it is intended that the invention be not limited by the embodiment or embodiments described, but, rather, that it be accorded in the interpretation consistent with the scope and spirit of its broad principles.

What is claimed is:

1. An expandable orbitable space platform comprising a pair of outer sealed pressurized cabins, a central sealed pressurized cabin, a pair of rigid telescopic means connected between said outer cabins and said central cabin, respectively, each of said telescopic means having respective portions thereof connecting each of said outer cabins to said central cabin, each of said telescopic means including a pair of interfitting elongated telescopic members mounted with one closely received within the other and supportingly secured respectively to said central cabin and to the associated one of said outer cabins, sealing means between each pair of telescopic members, said one interfitting member being disposed for pressure sealed longitudinally sliding movement within the other member to expand said platform, and restraining means for controlling the extent to which said telescopic members undergo separating and platform expanding movement when said platform is aloft where external ambient pressure is less than the internal cabin pressure.

2. An expandable orbitable space platform as set forth in claim 1 wherein said outer cabins communicate through said central cabin and through said telescopic portions and wherein ladder means are disposed in the space within the inner one of each pair of said interfitting members.

3. In an expandable orbitable space platform the combination comprising a pair of sealed pressurized cabins and a telescopic arrangement connecting said cabins together, said telescopic arrangement having one elongated telescopic member supportingly secured adjacent one end thereof to one of said cabins and disposed for pressure sealed longitudinally sliding movement within another elongated member which is supportingly secured adjacent one end thereof to the other of said cabins, cooperating stop members mounted respectively adjacent the free ends of said elongated members for limiting the expanding movement of said platform when aloft, and an additional stop member mounted adjacent the secured end of one of said elongated members and disposed for cooperative engagement with the associated one of said first-mentioned stop members for limiting the contracting movement of said platform during launching.

4. An expandable orbitable space platform comprising a pair of sealed pressurized cabins, rigid telescopic means connecting said cabins together, said telescopic means comprising a first elongated hollow member secured to one of said cabins, a second elongated hollow member secured to the other of said cabins and closely receiving at least a portion of said first member therein to provide a rigid connection between said cabins, said first member portion being movably mounted in said second member for pressure sealed longitudinal sliding movement therewithin to expand said platform, said hollow members forming a pressurized passageway between said cabins, restraining means coupled to said members for controlling the extent of telescoping sliding movement of said members, said cabins being filled with air or the like at an internal pressure which is intermediate the ambient pressure at the launch site and the ambient pressure in orbit so that said platform is urged toward its contracting configuration at the launch site and toward its expanded configuration in orbit.

5. An expandable orbitable space platform comprising a pair of outer sealed pressurized cabins and a central sealed pressurized cabin and a telescopic arrangement, said telescopic arrangement having respective portions thereof connecting each of said outer cabins to said central cabin, each of said telescopic portions including a pair of interfitting elongated telescopic members supportingly secured to said central cabin and to the associated one of said outer cabins, said interfitting members being disposed for pressure sealed longitudinally sliding movement one within the other and restraining means for controlling the extent to which said telescopic members undergo separating and platform expanding movement when said platform is aloft where external ambient pressure is less than the internal cabin pressure, said restraining means including an elongated cylinder rigidly supported relative to one of each pair of interfitting members, a piston disposed for longitudinal movement in each of said cylinders, and means for supporting a shaft of each of said pistons fixed relative to the other of each pair of interfitting members.

6. An expandable orbitable space platform comprising a pair of sealed and pressurized cabins mounted in spaced relationship, rigid telescoping means connected between said cabins to provide expanding movement of said platform when said platform is aloft in an environment where external ambient pressure is less than internal cabin pressure, said telescoping means comprising a first elongated hollow member secured to one of said cabins, a second elongated hollow member secured to the other of said cabins and closely receiving at least a portion of said first member therein to provide a rigid connection between said cabins, said first member portion being movably mounted in said second member for pressure sealed longitudinal sliding movement therewithin to expand said platform, and restraining means coupled to said members for controlling the extent of telescoping sliding movement of said members, said restraining means including stop means for arresting said telescoping movement while said first member is in part disposed within said second member.

7. An expandable orbitable space platform as set forth in claim 6 wherein said telescopic members are tubular in form and wherein at least one of said telescopic members extends through its associated cabin so as to provide main central support for each of opposed outer walls of said associated cabin.

8. An expandable orbitable space platform as set forth in claim 6 wherein said telescopic members are tubular in form and at least one of said telescopic members extends through its associated cabin so as to provide main central support for each of opposed outer walls of said associated cabin and wherein an annular skirt member is welded along one peripheral edge thereof to the exterior surface of the outer telescopic member and the adjacent one of said opposed cabin walls is welded to said skirt member.

9. An expandable orbitable space platform as set forth in claim 6, wherein said cabins communicate through said telescopic means and ladder means are disposed within said first telescopic member.

10. An expandable orbitable space platform as set forth in claim 6 wherein a peripheral canopy seal weld is provided between an end portion of the inner telescopic member and an adjacent end portion of the outer telescopic member when said telescopic members are in expanded relation.

11. An expandable orbitable space platform as set forth in claim 6 wherein each of the telescopic members is tubular in form and includes a plurality of elongated tubular segments joined together in end to end relation with at least those joints exposed to the exterior being sealed welded.

12. An expandable orbitable space platform comprising a pair of sealed and pressurized cabins mounted in spaced relationship, rigid telescoping means connected between said cabins to provide expanding movement of said platform when said platform is aloft in an environment where external ambient pressure is less than internal cabin pressure, said telescoping means comprising a first elongated hollow member secured to one of said cabins, a second elongated hollow member secured to the other of said cabins and closely receiving at least a portion of said first member therein to provide a rigid connection between said cabins, said first member portion being movably mounted in said second member for pressure sealed longitudinal sliding movement therewithin to expand said platform, restraining means coupled to said members for controlling the extent of telescoping sliding movement of said members, said restraining means including an elongated cylinder and a piston disposed for longitudinal movement along said cylinder, and means for securing said cylinder relative to said other cabin, a shaft connected to said piston and secured relative to said first elongated member, means for controlling the restraining pressure in said cylinder, and means for limiting the retracting and expanding movement of said elongated members including stop means for arresting said telescoping movement while said first member is in part disposed within said second member.

13. An expandable orbitable space platform as set forth in claim 12, wherein said piston and cylinder securing means include a laterally extending beam supported rigidly relative to said first elongated member and rigidly engaging an end portion of said piston shaft.

14. An expandable orbitable space platform comprising a pair of sealed cabins mounted in spaced relationship, rigid telescoping means connected between said cabins and movable relative to one another to expand said platform, said telescoping means comprising a first elongated hollow member secured to one of said cabins, a second elongated hollow member secured to the other of said cabins and closely receiving at least a portion of said first member therein to provide a rigid connection between said cabins, said first member portion being movably mounted in said second member for pressure sealed longitudinal sliding movement therewithin to expand said platform, means for imparting said longitudinal sliding movement between said members when said platform is aloft, and restraining means coupled to said members for controlling the extent of telescoping sliding movement of said members, said restraining means including stop means for arresting said telescoping movement while said first member is in part disposed within said second member.

References Cited by the Examiner

Proceedings of the Manned Space Stations Symposium, Los Angeles, California, April 20–22, 1960.

FERGUS S. MIDDLETON, *Primary Examiner.*

RALPH D. BLAKESLEE, MILTON BUCHLER,
*Examiners.*